United States Patent [19]
Plotnikoff

[11] 3,873,709
[45] Mar. 25, 1975

[54] METHOD OF TREATING PSYCHOSIS
[75] Inventor: Nicholas Peter Plotnikoff, Lake Bluff, Ill.
[73] Assignee: Abbott Laboratories, North Chicago, Ill.
[22] Filed: Feb. 19, 1974
[21] Appl. No.: 443,261

[52] U.S. Cl. ............................................. 424/274
[51] Int. Cl............................................. A61k 27/00
[58] Field of Search ........................... 424/273, 274

[56] References Cited
UNITED STATES PATENTS
3,737,549   6/1973   Plotnikoff ........................... 424/274

OTHER PUBLICATIONS

A Psychiatric Glossary, 3rd Ed. (1969), pp. 80–81.

Primary Examiner—Stanley J. Friedman
Attorney, Agent, or Firm—Paul D. Burgauer; Robert L. Niblack

[57] ABSTRACT

Psychosis is treated by the administration of a small amount of TRH.

3 Claims, No Drawings

METHOD OF TREATING PSYCHOSIS

DETAILED DESCRIPTION OF THE INVENTION

The present invention is directed to an improved method for treating psychosis. The classic drugs used for treating psychotic patients, chlorpromazine and other phenothiazines unfortunately are not at all satisfactory for prolonged treatment as they cause serious side effects, particularly tremors. Instances of Parkinsonism have also been reported following the use of some of the above drugs.

It is therefore the primary object of the present invention to provide a therapy for psychosis which does not lead to Parkinsonism or tremors. It is another object of this invention to provide a process for treating psychosis by administering a substance ordinarily already present in the healthy, normal warm-blooded animal.

These and other objects are accomplished by providing a process for alleviating the symptons of psychosis in a warm-blooded animal by administering to said animal a therapeutically effective amount of the thyrotropin releasing hormone (hereinafter referred to as TRH) L-pyroglutamyl-L-histidyl-L-prolinamide. In a preferred embodiment, TRH is administered orally or intraperitoneally at a dose of 20 – 80 mg./kg. in lower animals, while in higher animals, an oral dose of 1 – 20 mg./kg. per day produces the desired alleviation of the typical symptoms such as stereotyped behavior exhibited as head weaving, head bobbing, circling, rocking or jumping. These effects can easily be demonstrated in the animal model, based on the observation by Snyder, Am. J. Psychiatry 130:1 in January, 1973 who discovered that psychotic behavior can be induced in animals by amphetamines and simulates the conditions of clinical psychosis.

The observed effect in the animal model is independent of the pituitary function as TRH in this instance can be shown to act directly on the brain. The model employed to show the behavioral improvements by administration of TRH involves rhesus monkeys at various single doses, two animals for each dose, following by 1 hour the oral administration of 5 mg./kg. of a challenging dose of desoxyephedrine hydrochloride which produces the same symptoms as those present in psychotic patients. On a scale of 0 – 3 with 0 showing complete, 1 showing marked, 2 showing moderate and 3 showing no effect in reducing the symptoms, the following observations were recorded:

| Symptom/TRH Dose | 2.5 | 5 | 10 | 20 | 40 | 80 | mg./kg. |
|---|---|---|---|---|---|---|---|
| Increased Activity | 2 | 2 | 2 | 2 | 1 | 0 | |
| Mydriasis | 2 | 2 | 2 | 2 | 2 | 2 | |
| Piloerection | 2 | 2 | 2 | 2 | 1 | 1 | |
| Stereotyped Behavior | 2 | 2 | 2 | 2 | 0 | 0 | |

The above table shows that with 2.5 mg./kg. of TRH, the psychotic signs of chemically induced conditions are reversed and higher doses almost completely eliminate the outward signs of psychosis.

TRH is known to have essentially no toxic manifestation, it has an oral $LD_{50}$ of >4 g./kg. The therapeutic index for the above use thus is extremely high, being in the range of 50 – 200, and since the actual doses to be administered are small, it is easy to prepare the necessary dosage forms. Practical preparations are represented in the following examples.

EXAMPLE 1

An oral dosage consisting of 20 mg. tablets is prepared by mixing 20 g. of TRH, 20 – 50 of corn starch, 5 – 10 g. of colloidal silica, 1 – 5 g. of magnesium stearate and, if desired, minor amounts of flavoring and/or coloring agents. The homogenous blend is granulated in the usual fashion, dried, passed through a 60-mesh screen and compressed into 1000 bisected tablets in a tableting machine.

EXAMPLE 2

For intravenous, intramuscular or other parenteral administration, 1 g. of TRH is dissolved in 100 ml. of sterile water or physiological saline, buffered to a pH of 7.0 – 7.5 with sodium phosphate and optionally containing a preservative such as benzyl alcohol. The solution is filtered under sterile conditions and placed in ampoules containing 10 mg./ml. of TRH.

The TRH used in the above process is made synthetically by one of the methods known from the literature, e.g., the method of Folkers, et al., U.S. Pat. No. 3,746,607.

I claim:

1. The process of treating psychosis in a warm-blooded animal comprising administering to said animal an effective dose of L-pyroglutamyl-L-histidyl-L-prolinamide to alleviate the symptoms of psychosis.

2. The process of claim 1 wherein said L-pyroglutamyl-L-histidyl-L-prolinamide is administered orally at a dose of between 1 – 20 mg./kg./day.

3. The process of claim 1 wherein said L-pyroglutamyl-L-histidyl-L-prolinamide is administered parenterally to said animal at a dose of 1 – 20 mg./kg./day.

* * * * *